May 4, 1954  A. S. DODDS ET AL  2,677,552
STAKE APPARATUS FOR VEHICLES
Filed Sept. 12, 1951  2 Sheets-Sheet 1

INVENTORS.
ALEXANDER S. DODDS.
ROBERT E. DODDS.

BY  *Ross J. Chay*

ATTORNEY.

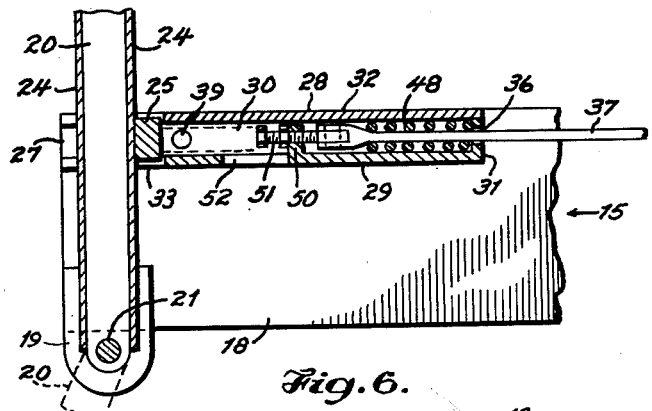
Fig. 6.
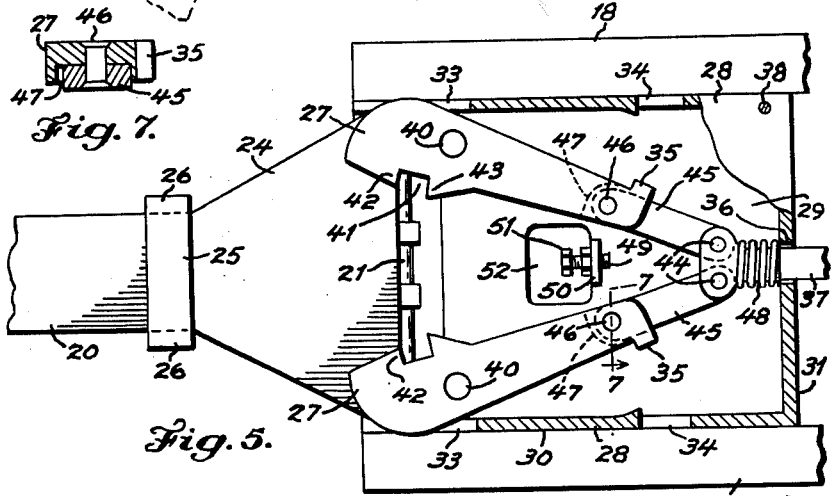
Fig. 7.
Fig. 5.
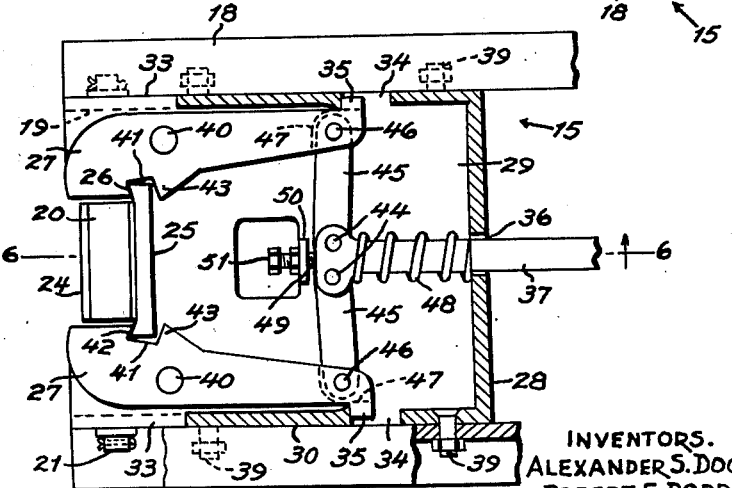
Fig. 4.
INVENTORS.
ALEXANDER S. DODDS.
ROBERT E. DODDS.
BY
ATTORNEY.

Patented May 4, 1954

2,677,552

UNITED STATES PATENT OFFICE 2,677,552

STAKE APPARATUS FOR VEHICLES

Alexander Spain Dodds and Robert Erskine Dodds, Sidney, British Columbia, Canada Application September 12, 1951, Serial No. 246,234

Claims priority, application Canada July 26, 1951

4 Claims. (Cl. 280—145)

This invention relates to new and useful improvements in stake apparatus for vehicles, and more especially does it relate to structure of this nature for use in retaining and discharging loads of logs, lumber, and the like, on trucks, trailers, railway cars, and similar transportation means.

As is well known in the art, upright or vertically positioned stakes may be mounted in brackets on the sides of vehicles for the purpose of retaining thereon loads, such as logs. Ordinarily, in order to discharge the load such stakes are manually removed from the brackets. But due to the pressure exerted on the stakes by the load this operation may be not only difficult but also dangerous.

An object of the present invention is the provision of stake apparatus wherein the foregoing and other disadvantages are overcome.

A further object of the invention is the provision of stake apparatus wherein the stake is pivotally connected to the side of the vehicle and upon being raised to the vertical position becomes locked in that position.

A further object of the invention is the provision of stake apparatus wherein, for purposes of discharging the load, the stake may be released from its vertical locked position by remote control.

A further object of the invention is the provision of stake apparatus having both primary and supplementary emergency locking means for retaining the stake in vertical position.

A further object of the invention is the provision of stake apparatus, a plurality of which may be mounted on a vehicle, the stakes being releasable simultaneously from vertical locked position.

Still a further object of the invention is the provision of stake apparatus which is novel and simple in form, rugged in nature, and which will satisfactorily perform the functions required of it.

Having regard to the foregoing and other objects and advantages which will become apparent as the description proceeds and the details become known, the invention consists essentially in the novel combination and arrangement of parts hereinafter described in detail and illustrated in the accompanying drawings in which:

Fig. 4 is a section taken on the line 4—4 of Fig. 3 with the top plate removed and the stake shown in plan.

Fig. 5 is a view similar to Fig. 4 showing the stake in released or unlocked position.

Fig. 6 is a section taken on the line 6—6 of Fig. 4.

Fig. 7 is a section taken on the line 7—7 of Fig. 5.

Figure 3:
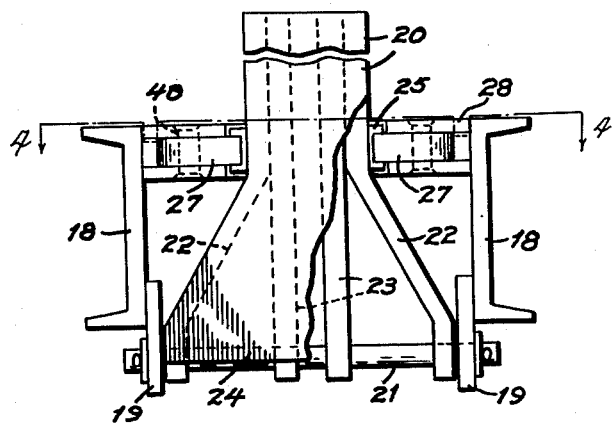
Fig. 3 is an enlarged elevational view of the stake apparatus shown detached from the vehicle.

Referring now to the accompanying drawings wherein the present invention is disclosed and wherein like numerals of reference designate corresponding parts in the various illustrations, the numeral 15 indicates the stake apparatus as a whole and the numeral 16 the vehicle upon which it is mounted.

The stake apparatus includes bolster support means 17, which comprise a pair of channel irons 18 mounted crosswise on the vehicle chassis and having welded to the ends thereof downwardly extending lugs 19. The lower end of a stake 20 is pivotally connected to the lugs 19 by means of shaft 21. The stake may take any appropriate shape or form and in the present instance we have shown it as being composed of a series of arm members 22 and 23. The lower ends of the arms 22 are spread outwardly toward their pivotal mounting. Welded to opposite faces of the arm members are sheets of metal 24 which provide a smooth, re-inforced, rigid structure. Secured to the stake by means of welding or the like is a locking bar 25 whose outer ends are hook shaped, as indicated at 26; the locking bar being so positioned on the stake that when the latter is in upright position the locking bar is in engagement with the grab hooks 27, to which reference will be made later.

Mounted between the channel irons 18 is a rectangular shaped housing 28, consisting of a base plate 29, side walls 30, rear end wall 31, and top plate 32. The front end of the housing is open. Adjacent the open end of the housing the side walls are cut away as shown at 33 to permit movement of the grab hooks 27 to open position, as will be later referred to. The side walls 30 are provided with apertures 34 for receiving the grab hook safety lugs 35, later referred to. The rear end wall is provided with an aperture 36 through which extends an operating control arm 37, also later referred to. The base plate, side walls, and rear end wall are held together preferably by welding, while the top plate, preferably, is detachably mounted on the side walls by means of screws 38 in order to facilitate inspection and repair. The housing 28 may be secured in position between the channel irons 18 by means of welding, but we prefer to mount it detachably; for example, by means of bolts as shown at 39. Preferably, the housing is mounted so that its upper surface is flush with the upper surfaces of the adjacent channel irons.

Pivotally mounted within the housing, as indicated at 40, are the grab hooks 27. Near its outer end each grab hook is provided with a recess 41 formed by two protruding lips 42 and 43. The recesses hold the locking bar 25 in locking engagement when the stake is in upright position, as indicated in Figures 4 and 6. At their inner ends the grab hooks are provided with laterally projecting safety lugs 35. When the stake is in upright locked position the safety lugs project into the housing apertures 34.

An operating control arm 37 extends through the aperture 36 at the rear end of the housing and is pivotally connected at 44 to toggle arms 45 which in turn are pivotally connected at 46 to the inner ends of the grab hooks. At the points of pivotal connection 46 between the toggle arms and grab hooks the latter are provided with recesses, indicated in Figures 4, 5, and 7 by the numeral 47, into which the ends of the toggle arms are received. The shape of the recesses is such that their walls prevent any movement of the pivot points 46 towards each other beyond the position indicated in Figure 5. This feature will be amplified later.

Mounted on the control arm 37 is a coil spring 48, one end of which bears against the rear end of the housing and the other end of which bears against the ends of the toggle arms 45.

Forward movement of the control arm 37 into the housing is limited by stop member 49 which comprises a leg 50 extending upwardly from base plate 29. Horizontally positioned in the leg 50 is an adjusting screw 51. Access to the adjusting screw is provided by an aperture 52 in the base plate 29. The adjusting screw is so set that the forward limit of movement of the control arm is reached when both points 46 are slightly forward of the imaginary line joining the two pivot points 44 as shown in Figure 4.

When the control arm is moved to the limit of its backward movement, as indicated in Figure 5, the longitudinal axes of the toggle arms and grab hooks form a straight line, each set of pivot points 40, 46, and 44 being in alignment. Movement of the pivot points 46 towards each other beyond the aligned position of Figure 5 is prevented by the walls of the recesses 47 against which the toggle arms bear when that limiting position is reached.

Figure 2:
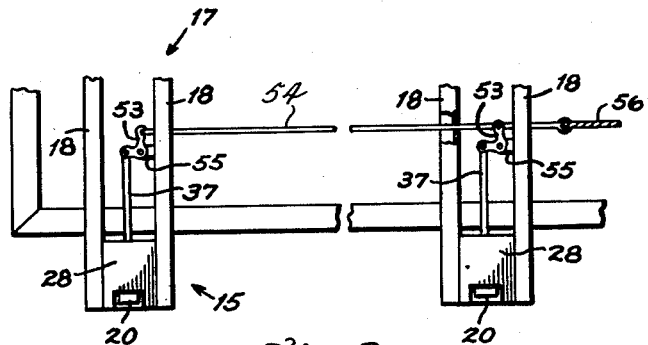
Fig. 2 is a fragmentary plan view of Fig. 1.
Figure 1:
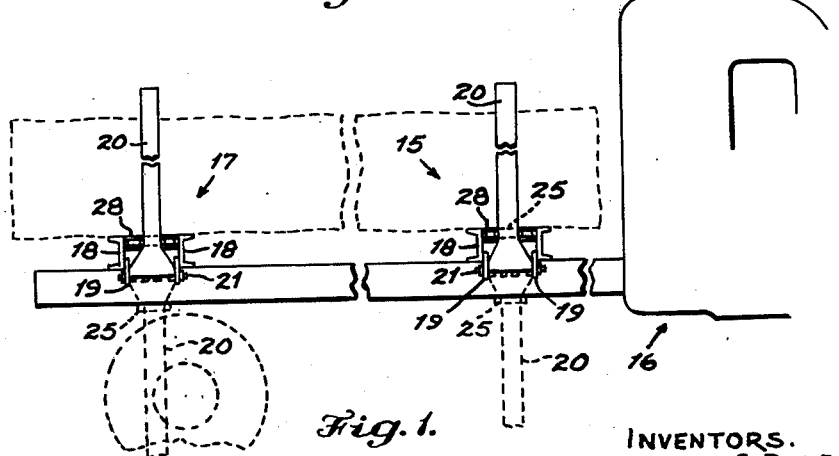
Fig. 1 is an elevational view disclosing two units of an embodiment of the present invention when mounted in parallel on a vehicle.

Normally a plurality of the stake apparatus units will be mounted on the vehicle in parallel. They may be mounted for operation towards either or both sides of the vehicle. In Figures 1 and 2 for purposes of illustration we have shown use of one pair of units mounted for operation on one side only of a unitary vehicle unit.

If it be desired to utilize the invention in connection with a multiple vehicle unit combination such as a truck-trailer combination, one of the bolster supporting means would be located on the truck unit and one on the trailer unit. Moreover, the truck bolster support means would normally be pivotally mounted upon the truck chassis by means well known in the art.

The control arm 37 may be moved backward from the position shown in Figure 4 to that shown in Figure 5 by any suitable means. We have indicated one possible arrangement in Figure 2. The control arms 37 are pivotally connected through bell cranks 53 to a connecting rod 54. The bell cranks are pivotally mounted on horizontal plates 55 welded to channel irons 18, as shown in Figure 2. The connecting rod 54 passes through, and is supported in, horizontal slots cut through the various channel irons 18 intervening between the rearmost bell crank and the vehicle cab. As an alternative to operation by mechanical means, the control arms may be simultaneously operated by air cylinders or other conventional hydraulic means.

The method of operation of the apparatus is as follows: When the vehicle is loaded, and we will assume that the load is of logs, the logs are supported from below by the bolster support means 17 and are supported against lateral displacement by the stake 20 which is in upright position, as shown in Figures 1, 3, and 6, and whose locking bar 25 is held in locking engagement by the lips 42 of grab hooks 27 as shown in Figure 4. Pressure of the load against the stake tends to force the outer ends of the grab hooks apart but such movement is prevented by the off-alignment position of pivot points 44 and 46, coupled with the stopping action of stop member 49. The pressure exerted on the toggle arms 45 by coil spring 48 insures against accidental backward movement of pivot points 44 into or beyond a position in alignment with pivot points 46.

Should the pivot points 40 shear off under pressure of the load, the safety lugs 35 would catch against the edges of housing apertures 34 thereby preventing release of the stake and the discharge of the load.

When it is desired to discharge the load, the control arm 37 is moved sharply in a backward direction. Moderate force is required to overcome the locking effect of the off-alignment position of pivot points 44 and 46; but once the pivot points 44 are forced into and then past the position of alignment, the pressure of the load, as transmitted through the stake 20 and the locking bar 25 and the lip 42 causes the outer end of the grab hooks 27 to spread, thereby releasing the stake to discharge the load. At the same time, the pressure exerted by spring 48 is overcome and the control arm 37 is forced backward to the limiting position shown in Figure 5 with great force. It is because of the great force of this backward movement of the control arm that some cushioning means between the hand of the operator and the control arm should be provided. In the drawings, we have shown as the cushioning means the rope 56. It will be seen from Figure 5 that when the control arm is moved to the limit of its backward travel the pivot points 40, 46, and 44 are in alignment. The reaction of the walls of the recesses 47 against the ends of the toggle arms 45 prevents the pivot points 46 from going past this position of alignment. Moreover, when this position of alignment is reached, it will be retained until further positive action is taken, for the pressure of the spring 48 against the aligned members has a locking effect.

The stake 20 may be reset simply by swinging it into upright position. The front edge of the locking bar 25 bears against lip 43 which causes the grab hooks 27 to pivot; the inner ends of the grab hooks spread apart disturbing the aligned position of the grab hooks 27 and toggle arms 45, whereupon the pressure of the spring 48 continues the pivoting movement of the grab hooks until the recesses 41 receive the locking bar 25 in locking engagement as shown in Figure 4.

It will be appreciated that adjusting screw 51 must not be set too far forward lest the grab hooks be released from engagement with the locking bar 25; moreover it would be difficult to overcome the pressure of the coil spring when resetting the stake. On the other hand, it must be forward sufficiently far to give the off-alignment locking effect described above. Accordingly, the appropriate position for adjusting screw 51 and the appropriate strength of the coil spring 48 must be, but may easily be, determined by experiment.

What we claim as our invention is:

1. In stake apparatus for vehicles of the character described, bolster support means mounted on the vehicle chassis, a stake pivotally connected to the bolster support means and provided with a locking bar, a pair of pivotally mounted grab hooks, said grab hooks being provided near their outer ends with recesses including inner and outer lips between which the locking bar is releasably held in locking engagement when the stake is in upright position, a control arm for releasing the grab hooks from locking engagement with the locking bar, a pair of toggle arms connecting the grab hooks to the control arm, said inner lip being engageable by the locking bar for resetting the grab hooks in locking engagement with the locking bar, and means for supporting the control arm and grab hooks on the bolster support means.

2. In stake apparatus for vehicles of the character described, a pair of parallel cross members mounted in spaced relationship on the vehicle chassis and provided at their ends with downward extensions, a stake pivotally connected to said downward extensions and provided with a locking bar, a housing mounted between the parallel cross members, a pair of grab hooks pivotally mounted in the housing, said grab hooks being provided near their outer ends with recesses including inner and outer lips between which the locking bar is releasably held in locking engagement when the stake is in upright position, toggle arms pivotally connected to the grab hooks, a control arm pivotally connected to the toggle arms and adapted to release the grab hooks from locking engagement with the locking bar, a spring mounted on the control arm between the housing and the toggle arms, a stop member for limiting the forward movement of the control arm, and said inner lip being engageable by the locking bar for resetting the grab hooks in locking engagement with the locking bar.

3. In stake apparatus for vehicles of the character described, bolster support means mounted on the vehicle chassis, a stake pivotally connected to the bolster support means, a pair of grab hooks pivotally mounted intermediate their ends and adjacent the outer edges thereof releasably holding the stake in locked engagement when the stake is in upright position, a pair of toggle arms each pivotally connected to a corresponding grab hook and pivotally connected to a control arm, said control arm being adapted to release the grab hooks from locking engagement with the stake, means normally urging the control arm forward, a stop member adapted to prevent forward movement of the points of pivotal connection between the toggle arms and control arm beyond a position slightly forward of the points of pivotal connection between the toggle arms and grab hooks, and means for supporting the control arm and grab hooks on the bolster support means.

4. In stake apparatus for vehicles of the character described, bolster support means mounted on the vehicle chassis, a stake pivotally connected to the bolster support means, a housing mounted on the bolster support means and provided with apertures in the side walls thereof, a pair of grab hooks pivotally mounted intermediate their ends in the housing and provided near their outer ends with recesses in which the stake is releasably held in locking engagement when the stake is in upright position, lugs projecting from the sides of the grab hooks and extending into the housing apertures when the stake is in upright position, a control arm for releasing the grab hooks from locking engagement with the stakes, a pair of toggle arms connecting the grab hooks to the control arm, and means for supporting the control arm and grab hooks on the bolster support means.

References Cited in the file of this patent

UNITED STATES PATENTS

| Number | Name | Date |
|---|---|---|
| 597,792 | Strahle | Jan. 25, 1898 |
| 776,292 | Buller | Nov. 29, 1904 |
| 2,350,999 | Beirise | June 13, 1944 |
| 2,477,202 | Puxon | July 26, 1949 |
| 2,526,930 | Bruso | Oct. 24, 1950 |

FOREIGN PATENTS

| Number | Country | Date |
|---|---|---|
| 94,070 | Sweden | Jan. 9, 1939 |